DAVID ARONSON
INVENTOR.

DAVID ARONSON
INVENTOR.

United States Patent Office 3,414,274
Patented Dec. 3, 1968

3,414,274
CONTROLLED LEAKAGE, CLOSE CLEARANCE
SEAL SYSTEM
David Aronson, Upper Montclair, N.J., assignor to
Harrworth, Inc., a corporation of Delaware
Filed June 1, 1965, Ser. No. 460,374
3 Claims. (Cl. 277—15)

ABSTRACT OF THE DISCLOSURE

This invention relates to seal systems of the controlled leakage close clearance type for rotary fluid machines wherein a sealing gland is provided for the rotary shaft or member at the point where it extends through the housing for the rotary fluid machine which sealing gland includes a mixing chamber, a sealing gas chamber and a clearance space in the sealing gland about the rotary shaft which communicates at one end with the working fluid in the rotary fluid machine and coacts with the mixing chamber and the sealing gas chamber so as to permit working fluid to flow from one direction through the clearance space to the mixing chamber and pressurized sealing gas from the sealing gas chamber to flow through the clearance space in a direction opposite from the working fluid; the quantity of working fluid flowing through the clearance space to the mixing chamber being controlled by the pressure of the sealing gas as regulated by a pressure regulator operatively responsive to the pressure in the sealing gas chamber which pressure in the sealing gas chamber is in turn controlled as a function of a sized orifice in an associated condenser which draws off the mixture of working fluid and sealing gas from the mixing chamber; the working fluid being condensed therein and recycled and a predetermined volume of sealing gas being passed through the sized orifice to maintain the desired control.

---

Figure 1:
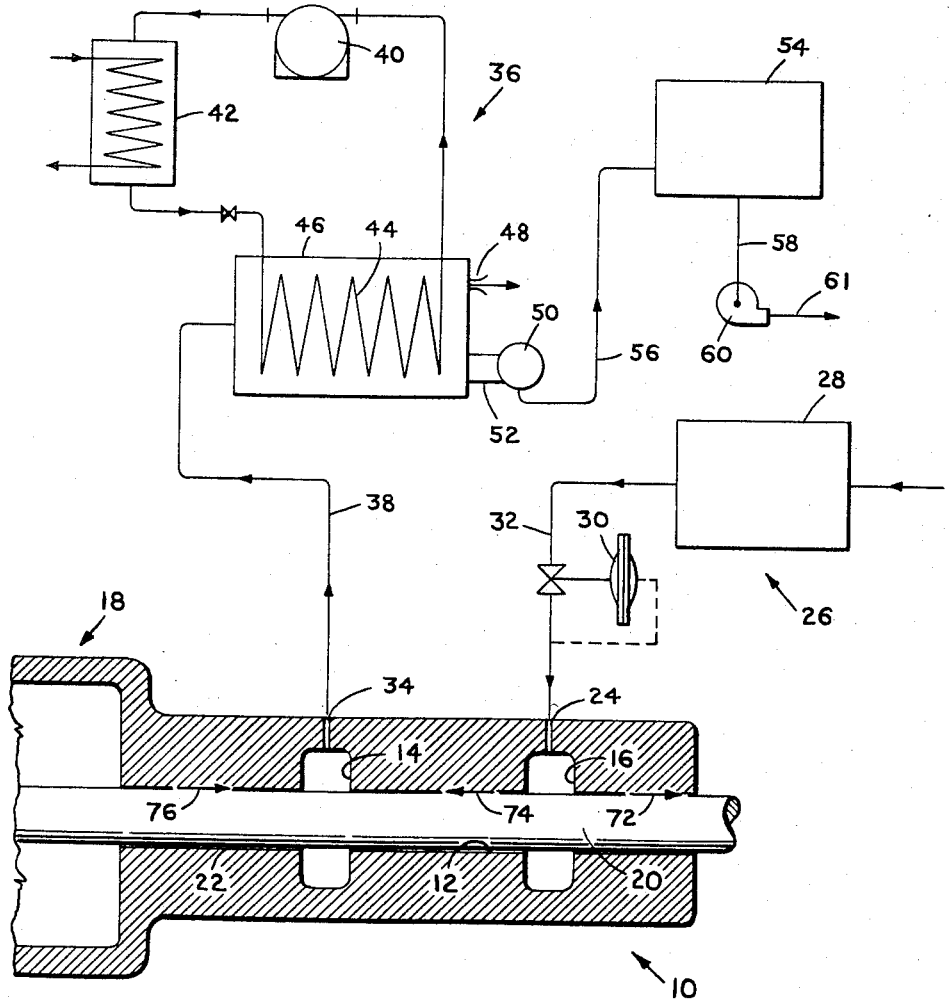

An object of the invention is the provision of seal systems as above which function to minimize working fluid losses in fluid machines which utilize condensible working fluids.

Another object of the invention is the provision of seal systems as above which utilize an inexpensive, readily expendable, non-condensible sealing gas to minimize condensible working fluid losses, as for example around rotating lead-out shafts, in fluid machines.

Another object of the invention is the provision of seal systems as above which eliminate the need for mechanical contact type, rotating seals and the attendant possibility of mechanicali failure thereof.

Another object of the invention is the provision of seal systems as above which eliminate the need for mechanical-oil seal systems and the attendant objectionable possibilities of oil-working fluid mixing and resultant fouling and corrosion of the fluid machine, or decomposition of the working fluid.

Another object of the invention is the provision of seal systems as above which provide for the readily controllable flow of very small quantities of the working fluid and sealing gas thorugh the seal system, and the subsequent condensation of a substantial portion of the said very small quantity of working fluid and return thereof to the fluid machine.

Another object of the invention is the provision of seal systems as above which are particularly adaptable for use in steam power plants located in remote areas of water scarcity, in the minimization of the operational losses of water, whereby the said power plants are made particularly adaptable for use in such areas.

Another object of the invention is the provision of seal systems as above which are particularly adaptable for use in closed system, heat power or refrigeration plants which utilize specialized, relatively expensive, and sometimes highly toxic, working fluids, whereby the losses thereof are minimized.

Another object of the invention is the provision of seal systems as above which are particularly inexpensive and durable design and construction, whereby the costs of fabrication and installation thereof are minimized, and long periods of satisfactory, maintenance-free operation thereof are assured.

In a herein disclosed preferred embodiment, the invention will be seen to comprise a gland structure which surrounds a rotating, lead-out shaft of a fluid machine. Spaced chambers are provided in the said gland structure, with one of said chambers being utilized for the introduction of a sealing fluid thereto, and another of said chambers being utilized for the mixing of said sealing fluid and a controlled quantity of leakage of the working fluid of the said fluid machine. Condenser means are provided in communication with said second chamber, whereby the mixture of the non-condensible sealing fluid, and the condensible working fluid may be passed therethrough to effect the condensation of substantially all of the condensible working fluid in the said mixture, and the return thereof to the fluid machine. Means are provided to regulate the amount of sealing fluid admitted to the first chamber in accordance with the amount of condensible working fluid which leaks into the second chamber.

Figure 2:
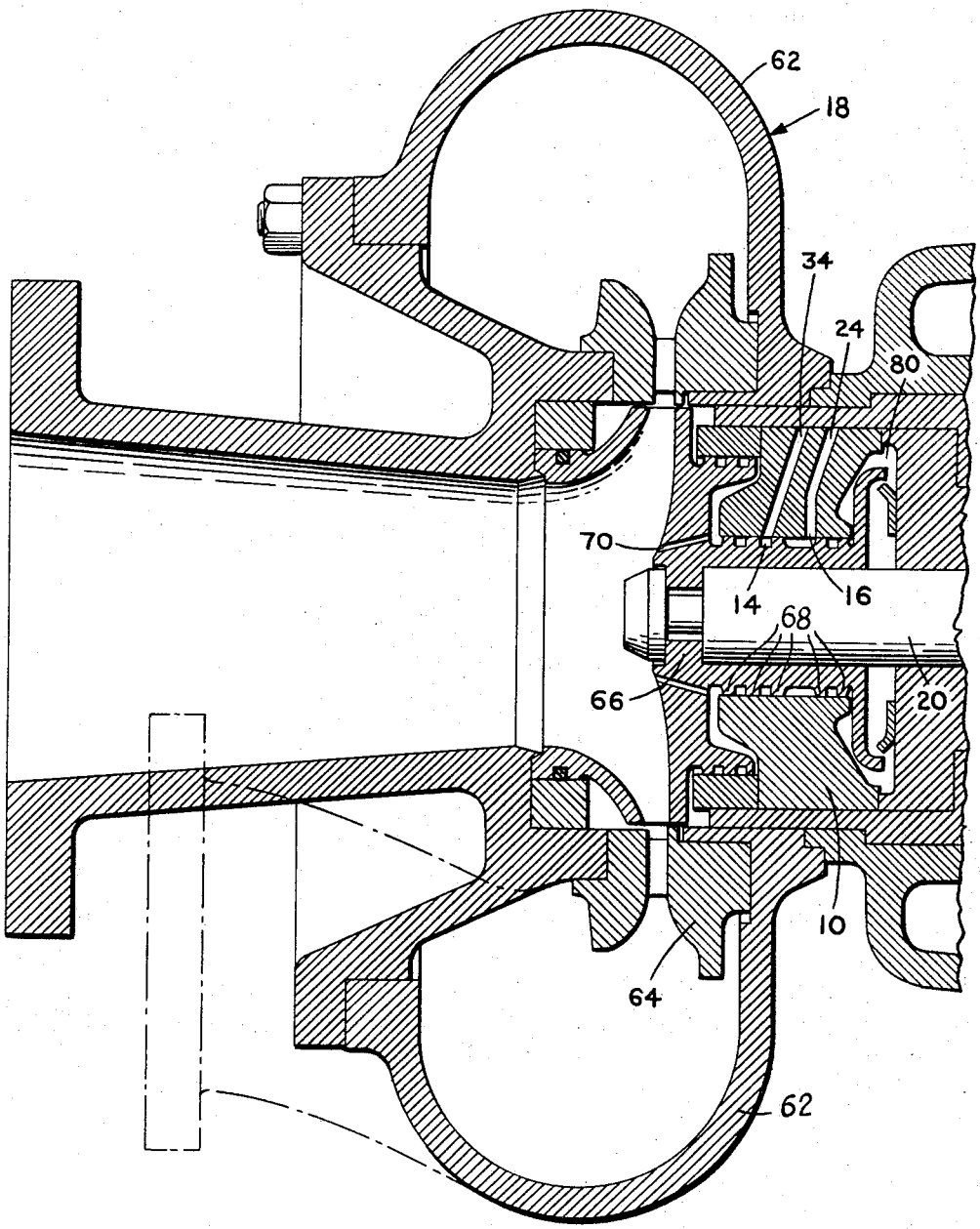

The above and other objects and advantages of the invention are believed made clear by the following detailed description thereof taken in conjunction with the accompanying drawings wherein:

FIGURE 1 is a schematic diagram of a seal system constructed in accordance with the teachings of our invention depicted in conjunction with a rotating, lead-out shaft of a fluid machine; and FIGURE 2 is a vertical cross sectional view taken along the axis of a gas expender turbine showing the application of the seal system of the invention thereto.

Referring now to FIGURE 1, a sealing gland is generally indicated at 10, and may be seen to comprise a bore 12 extending therethrough and spaced, generally cylindrical chambers 14 and 16 formed therein in communication with the bore 12. The said gland 10 may be continuous with the housing of a fluid machine, as indicated generally at 18, or may be removably attached thereto in any convenient manner, as for example, through the use of non-illustrated attachment flanges and attachment bolts.

A rotating, lead-out shaft 20 extends as shown through the bore 12 and may, for example, constitute the turbine rotor shaft of a gas expander turbine for use in either of a thermal power, or refrigeration, fluid machine. It is of particular importance to note that the said shaft 20 extends thorugh the bore 12 with clearance therebetween as indicated at 22, and that the size of clearance 22 is kept to the absolute minimum thereof commensurate with practicable machining limitations.

A flow passage 24 is formed in the gland 10 and extends therethrough from the exterior thereof into fluid flow communication with the interior of the chamber 16. Sealing fluid supply means are generally indicated at 26, and are in fluid flow communication as shown with the passage 24 through the medium of conduit 32 connected therebetween. The said sealing gas supply system 26 comprises compressor means 28, and pressure regulator means 30 connected in the conduit 32 for providing a suitable supply of non-consendsible sealing gas, at predetermined pressure, to the chamber 16 through flow passage 24.

A flow passage 34 is formed as shown in the sealing gland 10 and extends therethrough from the exterior thereof into fluid flow communication with the chamber 14. A condensing system is generally indicated at 36 and is connected as shown to the flow passage 34 by a conduit 38, whereby may be readily understood that the said condensing system is in fluid flow communication with the interior of the chamber 14. The said condensing system is of generally conventional construction and comprises a compressor 40, heat exchange means 42, and a condensing coil 44 which is positioned as shown in a condenser chamber 46. A restricted outlet is indicated at 48 and functions to place the interior of the condensing chamber 46 in restricted fluid flow communication with the atmosphere. Level control means 50 are positioned as shown adajcent the bottom of the condensing chamber 46 and are connected thereto through conduits 52.

A condensate receiver is indicated at 54 and is connected as shown by conduit 56 to the bottom of the level control means 50, whereby condensate collected in the condensing chamber 46 may be flowed therethrough to the said condensate receiver. A condensate pump is indicated at 60, and is connected to the condensate receiver 54 by a conduit 58 extending therebetween, with the said pump functioning to return condensed working fluid to the interior of the fluid machine through a conduit 61 in a manner described in detail hereinbelow.

An exemplary fluid machine 18 is depicted in greater detail in FIGURE 2 in order to make clear the application of the new and improved seal system of the invention thereto. As seen therein, the said fluid machine comprises a gas expander turbine having an inlet casing 62 with radial nozzle vane assemblies 64 positioned therein as shown. A radial flow turbine rotor 66 is positioned in the depicted overhung manner, within the said turbine casing 62 from a turbine rotor shaft 20. Suitable concentric annuli 68 are formed as shown on the said turbine rotor and extend as close as possible, within practicable machining limits, to the adjacent surface of the sealing gland 10, without contact therebetween to thus form a labyrinth in cooperation therewith.

Bleed holes 70 are formed as shown in the turbine rotor 66 to enable the flow of small quantities of the working fluid to and through the said labyrinth formed by the said annuli and sealing gland, respectively. In this application, the chambers 14 and 16, and the flow passages 24 and 34, are formed as shown in the sealing gland 10, it being understood that nonillustrated means are provided, as indicated by the arrows 80, to enable the flow of sealing gas from the chamber 16 to the atmosphere through the labyrinth formed by the annuli located to the right of the said chamber as seen in FIGURE 2.

The application of the new and improved seal system of the invention to a thermal power system which utilizes an organic working fluid, as for example a halogenated hydrocarbon such as dichlorodifluoromethane, commonly referred to as Power Fluid–12 or Payon–12, will now be described in detail with reference to both FIGURES 1 and 2. In such application, it is necessary that the condensible working gas be substantially free of both oil and water to prevent the decomposition of the organic power fluid upon the mixing thereof, and prevent corrosion and or fouling of the power turbine shaft and bearing assemblies. Thus, in applications of this nature, the compressor means 28 of the sealing gas supply system 26 (FIG. 1) will possibly include suitable filtering and drying means to insure that the sealing gas supplied thereby to the sealing gland 10 is substantially oil and water free. In addition, it is essential that the said sealing gas be chemically inert with relation to the working fluid with which the same will come in contact during operation of the seal system, to prevent undesirable chemical reaction therebetween. In this regard, it may be understood, that air has proven particularly satisfactory for use as the sealing gas in thermal power applications which utilize organic working fluids of the nature referred to hereinabove.

In operation, the pressure regulator 30 is first adjusted to provide a sealing gas pressure within the chamber 16 which is sufficiently above atmospheric to provide for the flow of a portion of the sealing gas from the said chamber to the atmosphere through the clearance 22 as indicated by the arrow 72 in FIGURE 1, while at the same time preventing back diffusion around the shaft 20 in the opposite direction. It is also essential, of course, that the pressure regulator 30 be set to provide a sufficiently high pressure in chamber 16 so that the pressure in chamber 14 is above the pressure in the condensing chamber 46 of the condenser means 36 to permit flow therebetween through conduit 38 as described in detail hereinbelow.

In addition, the size of the opening in the restricted outlet 48 from the condensing chamber 46 is determined by taking into account the total flow of the sealing gas into the said condenser and providing an opening size in view thereof which will insure a pressure in the said condensing chamber which is sufficiently lower than the working fluid pressure in the power turbine 18. Preferably, it has been determined that the pressure in the condensing chamber 46 should be less than 50% of the pressure of the working fluid in the power turbine 18. In addition, the size of the restricted opening 48 is chosen so that the flow area therethrough is very much smaller than the flow area of the clearance 22, as for example $\frac{1}{1,000}$ thereof, for purposes described in detail hereinbelow.

Once the proper setting for the pressure regulator 30, and the proper flow area for the restricted opening 48, have been determined, operation of the fluid machine 18 and the seal system of the invention may be commenced. Thus, the pressurized sealing gas, in this case bone-dry, substantially oil free air, will commence to be delivered from the sealing gas supply means 26 to the interior of the chamber 16 through the conduit 32 and flow passage 24 which are in fluid flow communication therewith. As the said sealing gas fills the chamber 16, it will flow therefrom in opposite directions through the clearance 22 located between the shaft 20 and the bore 12 in the sealing gland 10. As this occurs, the major portion of the said sealing gas will leak off to atmosphere through the clearance 22 in the direction indicated by the arrow 72 in FIGURE 1, due to the marked differences in flow areas between the said clearance and the restricted opening 48 in the condensing chamber 46.

The remaining portion of the said sealing gas will flow from the chamber 16 through the clearance 22 to the chamber 14 in the manner indicated by the arrow 74 in FIGURE 1. Concurrently therewith, a small portion of the working fluid from the fluid machine 18, in this case vaporized Rayon–12 will leak from the said fluid machine to the chamber 14 through the clearance 22 in the manner indicated by the arrow 76 in FIGURE 1. In a fluid machine of the nature of the gas expander turbine 18 as depicted in FIGURE 2, the controlled leakage of a small portion of the vaporized working fluid will occur through the bleed holes 70 provided therefor in the turbine rotor 66.

Thus, the vaporized and readily condensible working fluid from the fluid machine 18, and the incondensible sealing gas from the source of supply 26 thereof, will mix in the chamber 14 and flow therefrom through the flow passage 34 and conduit 38 to the condensing chamber 46 of the condensing apparatus 36, in that the pressure in the said condensing chamber is maintained at a lower level than the pressure in the chamber 14 for this purpose as described in detail hereinabove.

As the mixture of the incondensible sealing gas, and the condensible working fluid enter the condensing chamber 46 and flow therethrough in contact with the condensing coil 44, substantially all of the condensible working fluid will be condensed and collect in the bottom of the condensing chamber 46, while the incondensible sealing gas containing the very small quantity of the condensible working fluid which is not condensed, will flow from the condensing chamber 46 to atmosphere through the restricted opening 48.

As the condensed working fluid collects in the bottom of the condensing chamber 46 it will be periodically transferred therefrom to the receiver 54 through the action of the liquid level control means 50 and the conduits 52 and 56 connected therebetween. The now liquid working fluid is then returned, in any convenient manner, to the fluid machine 18. This may be accomplished, for example, in the manner depicted in FIGURE 1, wherein the said liquid working fluid is pumped from the receiver 54 through conduit 58 by pump 60 and returned thereby to the fluid machine 18 through conduit 61. This may be clearly understood whereby the seal system of the invention effectively utilizes a readily expendable, incondensible sealing gas, as for example bone-dry, oil free air, to effect absolute minimization of sealing losses of a valuable working fluid in the operation of a fluid machine.

As in most seals which utilize a sealing fluid, it may be noted that the seal system of the invention operates by balancing pressures, namely sealing gas and working fluid pressures, to minimize sealing losses of a working fluid. Significant difficulties have been encountered in the prior art in obtaining a seal system mechanism capable of balancing these pressures exactly in order to prevent either escape of the working fluid as for example to atmosphere through the clearances 22 of FIGURE 1, or entry of the sealing gas into the fluid machine, as for example again through the clearances 22. In general, very small pressure unbalances will lead to these undesirable results. In the seal system of the invention, the pressure regulating device 30 is used only as a coarse adjustment, the precise control necessary for proper pressure balancing being obtained by the selection of the flow area of restricted opening 48.

This is believed made clear by consideration of the flow of the incondensible sealing gas. As described in detail hereinabove, the said sealing gas leaves the chamber 14 mixed with the vaporized working fluid and passes therefrom through the flow passage 34 and conduit 38 to the condensing chamber 46, wherein the said working fluid is substantially condensed. The incondensible sealing gas, containing only a very small quantity of the vaporized working fluid which has not been condensed in the said condensing chamber, then passes therefrom through the restricted opening 48 and, of course, constitutes the very major portion of the flow through the said restricted opening. Obviously, the amount of the sealing gas that passes from the condensing chamber 46 through the restricted opening 48 must be the same as the amount of the sealing gas which enters the condensing chamber 46 through the conduit 38, once equilibrium conditions are reached. Thus, the magnitude of the sealing gas flow is established.

Since, in most applications, the magnitude of this sealing gas flow through the orifice is extremely small, as for example, in the order of one cubic foot per day, it need not be held within extremely close tolerances, and may be controlled quite simply by the restricted opening 48 to thus make unnecessary the provision of a moving valve element to control the said flow. Thus, variation in this flow in the order of doubling it or halving it is quite permissible in terms of the effect thereof upon the overall loss of working fluid, since the percentage of working fluid in this flow is so sery small.

The pressure drop across the restricted opening 48 which establishes the flow of sealing gas is substantially equal to the difference between seal system and ambient pressure, with the said sealing gas flow being determined primarily by the desirability of the smallest practicable sealing gas flow from the orifice 48 to atmosphere due to the fact that a quantity, even through very small, of the vaporized working fluid fails to condense in the condensing chamber 46 and is thus lost to atmosphere through the orifice 48. In this regard, it may be noted that the proportion of vaporized working fluid which is not condensed is determined primarily by the partial pressure of the vaporized fluid which leaves the condensing chamber 46. On the other hand, the flow of sealing gas must be large enough to prevent back diffusion of significant amounts of the vaporized working fluid out of the seal, and to prevent back flow within the sealing gland 10 during transient changes in the operation of the fluid machine 18, which would, of course, momentarily effect the pressure of the working fluid therein. The pressure drop of the sealing gas in the sealing gland 10 will be very small because the ratio of the flow area of the orifice 48 to the flow area of the clearance 12 is very small, as described above.

The flow of vaporized working fluid through the sealing gland 10 is determined by the pressure drop in the clearance 12 between the interior of the fluid machine 18 and of the chamber 14. Preferably, this pressure drop is substantially equal to the pressure difference maintained by the pressure regulator 30. It is not esssential in the seal system of the invention that the pressure regulator 30 maintain an absolutely constant pressure difference, because any minor variations therein will result simply in a small change of flow.

The condensing chamber 46 is preferably constructed with a considerable excess cooling capacity, as for example, 2 to 3 times that which will be necessary in most applications. Thus, the condenser will be capable of condensing substantially all of the vaporized working fluid which flows therethrough the use of only part of the condensing surfaces of the condensing coil 44. The remainder of the said surfaces will simply be contacted by the incondensible sealing gas during the flow thereof through the condensing chamber. Thus, if the overall flow of the vaporized working fluid is significantly increased, as for example by readjustment of the pressure regulator or a significant change in the operational conditions of the fluid machine 18, the increase flow of vaporized working fluid through the condensing chamber 46 will simply displace some of the incondensible sealing gas from contact with the condensing coil 44. Thus, additional condensation of the vaporized working fluid will take place within the condensing chamber 46 and a new equilibrium condition will be reached under which the amount of the vaporized working fluid flowing into the condensing chamber 46 will equal the increased amount of working fluid condensed therein, plus the very small amount of working fluid which remains in the vapor state and is lost to atmosphere with the sealing gas through the orifice 48. It is thus believed made clear that the excess condensing capacity of the condensing means 36 provides a self-regulating adjustment for maintaining equilibrium conditions in so far as the condensation of the vaporized working fluid, and the very small losses thereof, are concerned. Further, although both the vaporized working fluid, and sealing gas, cooperate in stabilizing the operation of the condensing means 36, the respective flows thereof are established independently, with the flow of the sealing gas being established by the flow area of the orifice 48, and the flow of the vaporized working fluid by the pressure drop in the sealing gland 10 as established by the pressure regulator 30.

It will be understood that the invention is not to be limited to the specific construction or arrangement of parts shown but that they may be widely modified within the invention defined by the claims.

1. In a close clearance sealing system for a fluid machine having a housing containing a condensable working fluid, a rotatable member extending from said housing, and a sealing gland connected to said housing and coacting with said rotatable member;
  (a) said sealing gland having a bore therein adapted to receive said rotatable member and to form a clearance space about said rotatable member in communication with the working fluid in said housing;

(b) mixing chamber means in said sealing gland in communication with the clearance space to collect vaporized working fluid flowing from said housing through said clearance space;

(c) at least one sealing chamber means in said sealing gland remote from said housing and spaced from said mixing chamber means in communication with the clearance space to permit sealing gas delivered to said sealing gas chamber means to pass along said clearance space into said mixing chamber in a direction opposite from the flow of said vaporized working fluid along said clearance space;

(d) inlet means connecting said sealing gas chamber means to a source of sealing gas under pressure;

(e) pressure regulating means in said inlet means to regulate the flow of sealing gas to said sealing gas chamber means responsive to the pressure therein;

(f) condensing means;

(g) said mixing chamber means having an outlet;

(h) means connecting the outlet of said mixing chamber means to said condensing means to permit the mixture of condensable working fluid and non-condensable sealing gas in said mixing chamber means to pass through said condensing means;

(i) said condensing means including a sized opening therein for discharging a predetermined volume of sealing gas from said condenser;

(j) said opening sized to maintain said condenser at a pressure less than the pressure in said mixing chamber means to maintain continuous flow of said mixture of non-condensable working fluid and non-condensable sealing gas to said condenser when said sealing system is in operation and to permit said sized opening to coact with said pressure regulating means whereby at least one portion of the sealing gas from said sealing chamber is caused to flow into said mixing chamber means in order to maintain dynamic equilibrium of the working fluid flowing into said mixing chamber.

2. The apparatus of claim 1 wherein said condensing means sized opening is a restricted orifice having a flow area significantly smaller than said clearance space.

3. The apparatus of claim 2 wherein said condensing means has connected therewith recycling means for said working fluid to return the working fluid to the fluid machine after the working fluid is separated from the sealing gas.

References Cited

UNITED STATES PATENTS

| | | | |
|---|---|---|---|
| 1,529,350 | 3/1925 | Emmet | 277—15 X |
| 3,085,808 | 4/1963 | Williams | 277—3 |
| 3,145,542 | 8/1964 | Aronson | 277—15 X |
| 3,235,269 | 2/1966 | Olesen | 277—15 X |

FOREIGN PATENTS

| | | |
|---|---|---|
| 315,789 | 6/1930 | Great Britain. |
| 852,805 | 11/1960 | Great Britain. |

SAMUEL ROTHBERG, *Primary Examiner.*